(No Model.)　　　　　　　　　　　　2 Sheets—Sheet 1.

W. ROBINSON.
CABLE CAR FOR STREET RAILWAYS.

No. 444,184.　　　　　　　　　Patented Jan. 6, 1891.

WITNESSES　　　　　　　　　　　　INVENTOR
Henry W. Williams　　　　　　　　William Robinson
Joseph Eshbaugh (No Model.) 2 Sheets—Sheet 2.

W. ROBINSON.
CABLE CAR FOR STREET RAILWAYS.

No. 444,184. Patented Jan. 6, 1891.

WITNESSES
INVENTOR
William Robinson

UNITED STATES PATENT OFFICE.

WILLIAM ROBINSON, OF BOSTON, MASSACHUSETTS, ASSIGNOR TO THE ROBINSON RADIAL CAR TRUCK COMPANY, OF PORTLAND, MAINE.

CABLE CAR FOR STREET-RAILWAYS.

SPECIFICATION forming part of Letters Patent No. 444,184, dated January 6, 1891.

Application filed April 3, 1882. Renewed June 2, 1890. Serial No. 354,006. (No model.)

*To all whom it may concern:*

Be it known that I, WILLIAM ROBINSON, of Boston, in the county of Suffolk and State of Massachusetts, have invented new and useful Improvements in Cable Street-Railway Cars, of which the following is a specification.

This invention relates to that class of street or tram railway cars adapted to be moved or drawn by means of traveling cables, wire ropes, or belts; and it consists in mechanism described below whereby the trucks or wheel-frames are properly radiated when the car is passing over a curved track, and are of course prevented from being radiated when the car is passing over a straight track.

Figure 1:
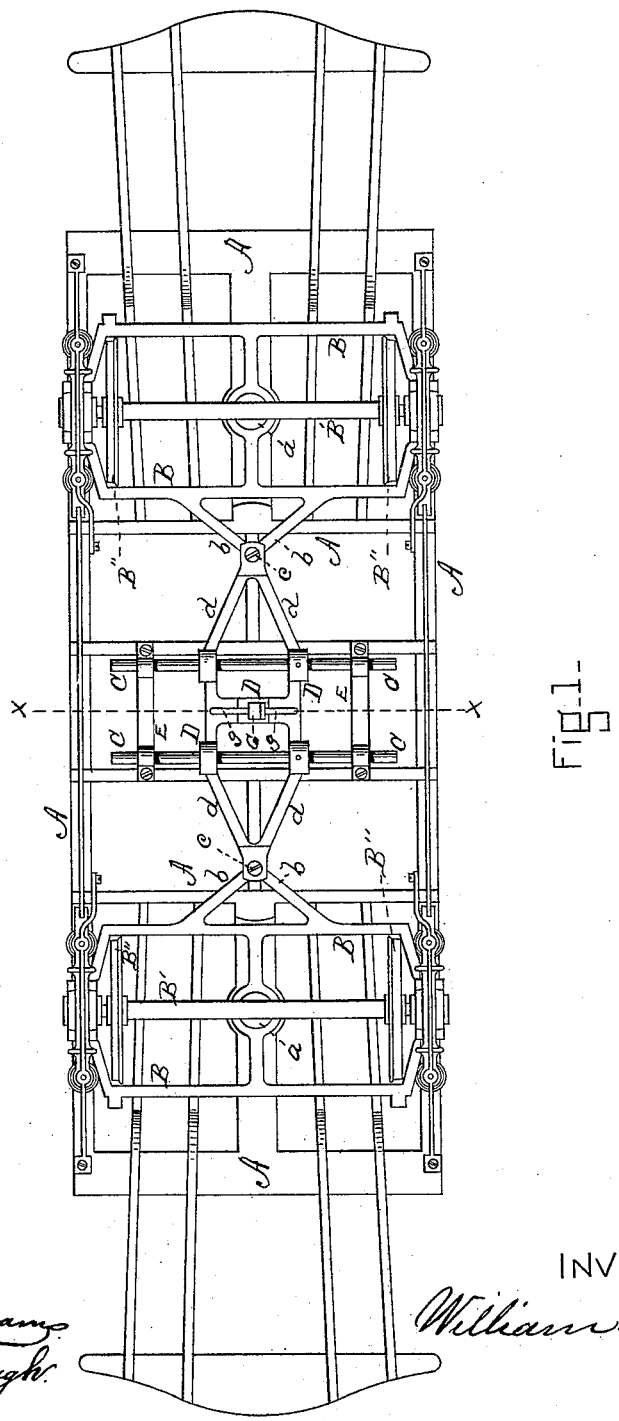
Figure 2:
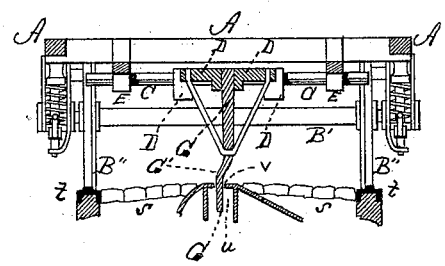
Figure 3:
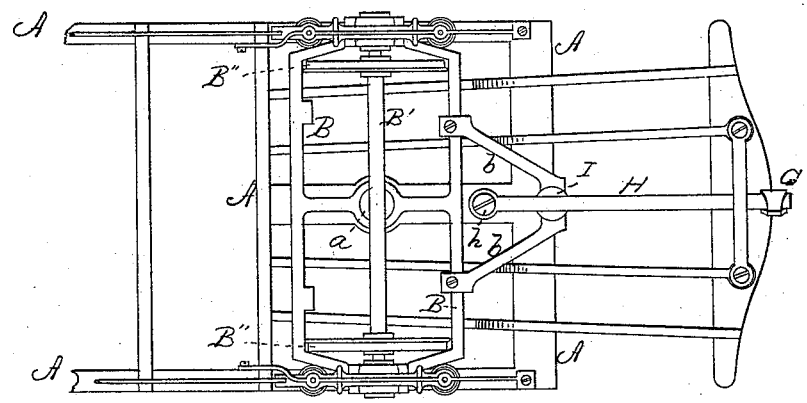

In the accompanying drawings, in which similar letters of reference indicate like parts, Figure 1 is a plan view of the under side of the bottom frame of a cable street-railway car embodying my invention. Fig. 2 is a transverse section on line $x\ x$, Fig. 1. Fig. 3 is a plan view of a portion of the under side of the bottom frame, showing a modification.

A represents the frame of the car-bottom, to which are pivoted at $a$ the truck B, carrying the axles B' and wheels B''. Brackets $b$, rigidly secured to or integral with the truck B, are loosely connected at $c$ with brackets $d$, rigidly secured to or integral with the frame D by means of pivots working in slots or in other suitable manner, whereby slight elongation of the parts is permitted, when the frame D is thrust one side for the purpose of radiating the truck. The frame D is preferably rigidly secured to the sliding rods C, which lie loosely in suitable openings in the bars E, which are rigidly secured to the frame A. As is evident, sliding the rods C in the bars E produces lateral motion in the frame D, fixed to said rods, which motion carries the inner ends of the trucks B to one side, thus producing radiation of said trucks with their axles B'.

Centrally fixed to the frame D and preferably braced by the rods $g\ g$, so as to prevent lateral bending, is the guiding-bar G. This bar extends from said frame into the longitudinal slot between the rails, through which the clamping device reaches the cable.

In Fig. 2, $s$ represents the road-bed, $t$ the rails, $u$ the upper portion of the tube containing the cable, and $v$ the narrow metal-lined slot through which the clamping device reaches the cable and through or into which the guiding-bar G extends. As this slot is not ordinarily equidistant between the rails, the bar G is usually bent slightly at G' in order to reach the slot and still be centrally located in the frame D; but the bar G may be attached to the frame D at any suitable or convenient point. As the car moves over a curved piece of track the guiding-bar G, which lies in the slot $v$, moves the frame D laterally (with reference to the car-body) and causes the trucks to be radiated, the force which radiates them being applied centrally between them.

In order that the proper radiation may be produced in the trucks—viz., such radiation that the axles will, when passing over a curved track, take positions on lines which are radii of the circle or arc described by such curved track, and of course when passing over a straight track will be at right angles to the line of the same—the guiding-bar G and pivotal connections $c\ c$ must necessarily be in certain relative positions—that is to say, if three lines radial to the circle or arc described by the curved track upon which the car was standing should be drawn, two of which passed through the centers of the axles B' and the third through the guiding-bar G where it is secured to the frame D, and then lines at right angles to said radial lines tangent to the arc passing through the center of said curved track—i. e., midway between the rails—the intersections of the three tangent lines would indicate the proper locations of the pivotal points $c\ c$.

It will readily be perceived that the guiding-bar G may at the points of its contact with the sides of the slot $v$ be provided with wheels or rollers in order to lessen the friction. A special slot may be constructed for the guiding-bar, if desired, or a grooved rail or one of the ordinary rails may be grooved and the bar extended to that point, all of which would produce the same result.

In the modification shown in Fig. 3 each truck is independent of the other and is provided with its own guiding-bar G, which is placed at the end of a horizontal lever H, pivoted at h to the frame A and preferably sliding in a slotted disk I, which partially rotates in the bracket b, fixed to the truck. As the lever H moved by the guiding-bar G swings, it moves the truck with its axle into a radial position on curves and into a position at right angles to the track on straight lines. Thus each axle is under all circumstances kept in a position at right angles to the line of travel.

I do not herein broadly claim the combination of the truck pivotally connected to the car-frame with a horizontally-swinging draw-bar pivoted independently to said car-frame and loosely engaging said truck for the purpose of radiating the same, since I describe and claim such combination in my pending application for a patent for an improvement in railway-cars, filed May 19, 1884, Serial No. 131,953.

Having thus fully described my invention, what I claim, and desire to secure by Letters Patent, is—

1. In a railway-car, the combination of the swiveling truck B, the laterally-moving frame or bar supported by the car-body and adjustably connected to said swiveling truck, and the guiding-bar G, connected to said laterally-moving bar and controlling the movement thereof, said guiding-bar G engaging in a slot or groove in the roadway parallel to the rail of the track, whereby the axle of said swiveling truck is brought into a radial position on curved tracks, substantially as described.

2. In a railway-car, the sliding bar or frame D, provided with the vertical guiding-bar G and adapted to be moved laterally on said car by means of said guiding-bar G, in combination with the swiveling trucks B B, pivotally connected to said sliding bar or frame D, situated between said trucks, the whole combined and operating substantially as described.

3. The combination of the following elements: the car-frame A, the swiveling trucks B B, and the laterally-sliding frame D, situated between said trucks and pivotally connected thereto, said sliding frame D being supported by said car-frame A and provided with the guiding-bar G, substantially as described.

4. The combination of the following elements: the car-frame A, the swiveling trucks B B, the laterally-sliding frame D, situated between said trucks and pivotally connected thereto and provided with the vertical guiding-bar G, and the roadway s, provided with a longitudinal slot or groove parallel to the rail of the track, substantially as described.

5. In a railway-car provided with swiveling trucks or axle-frames, the combination of a swiveling axle-frame, a laterally-moving bar or device supported by the car-frame and adjustably connected to said swiveling axle-frame and controlling the movement thereof, and a projecting bar or device secured to said laterally-moving bar and adapted to project into or engage in a longitudinal slot or groove in the roadway parallel to the rails of the track, whereby the axles of said car are caused to take radial positions on curved tracks and to become parallel on straight lines, substantially as described.

6. In a railway-car, the combination, with the swiveling truck or axle-frame carrying a single pair of wheels with their axle, of a downwardly-projecting guiding bar or device movable laterally with reference to the car-body and connected to said swiveling truck, said guiding bar or device projecting downwardly into or engaging in a longitudinal slot or groove in the roadway parallel to the rail of the track, whereby the lateral movement of said downwardly-projecting guiding bar or device produced by said slotted roadway will cause said axle to take a radial position on curved tracks, substantially as described.

WILLIAM ROBINSON.

Witnesses:
HENRY W. WILLIAMS,
JOSEPH ISHBAUGH.